US006937765B2

(12) United States Patent
Skourikhine et al.

(10) Patent No.: US 6,937,765 B2
(45) Date of Patent: Aug. 30, 2005

(54) METHOD FOR CONTOUR EXTRACTION FOR OBJECT REPRESENTATION

(75) Inventors: Alexei N. Skourikhine, Los Alamos, NM (US); Lakshman Prasad, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 214 days.

(21) Appl. No.: 10/388,680

(22) Filed: Mar. 14, 2003

(65) Prior Publication Data

US 2004/0179737 A1 Sep. 16, 2004

(51) Int. Cl.[7] ............................. G06K 9/48; G06T 11/20
(52) U.S. Cl. ...................................... 382/199; 345/442
(58) Field of Search ................................ 382/173, 180, 382/181, 190, 199, 203, 205, 266, 316; 345/442

(56) References Cited

U.S. PATENT DOCUMENTS

| | | | | |
|---|---|---|---|---|
| 5,050,222 A | * | 9/1991 | Lee | 382/176 |
| 5,119,439 A | * | 6/1992 | Osawa et al. | 382/199 |
| 5,448,692 A | * | 9/1995 | Ohta | 715/520 |
| 5,583,949 A | * | 12/1996 | Smith et al. | 382/199 |
| 5,590,220 A | * | 12/1996 | Takahashi | 382/203 |
| 6,173,075 B1 | | 1/2001 | Collins | 382/203 |
| 6,411,733 B1 | * | 6/2002 | Saund | 382/190 |
| 6,674,904 B1 | * | 1/2004 | McQueen | 382/199 |

OTHER PUBLICATIONS

Mingwu Ren et al., "Tracing Boundary Contours in a Binary Image", Image and Vision Computing 20 (2002) 125–131.
Y. B. Bai et al., "Object Boundary Encoding—A New Vectorisation Algorithm for Engineering Drawings", Computers in Industry 46 (2001) 65–74.
Norman L. Jones et al., "Fast Algorithm for Generating sorted Contour Strings", Computers and Geosciences 26 (2000) 831–837.
S. Di Zenzo et al., "Run–Based Algorithms for Binary Image Analysis and Processing", IEEE Transactions on Pattern Analysis and Machine Intelligence, vol. 18, No. 1, Jan. (1996).
Ernesto Bribiesca, "A New Chain Code", Pattern Recognition 32 (1999) 235–251.
Serkan Kaygin et al., "A One–Pass Algorithm to Detect Region Boundaries", Pattern Recognition Letters 22 (2001) 1169–1178.
Lakshman Prasad et al., "A Geometric Transform for Shape Feature Extraction", Vision Geometry IX, L. Latecki, D. Mount, A. Wu, R. Melter, Editors, Proceedings of SPIE vol. 4117 (2000) 222–233.
Lakshman Prasad et al., "Multi–Scale Discretization of Shape Contours", Vision Geometry IX, L. Latecki, D. Mount, A. Wu, R. Melter, Editors, Proceedings of SPIE vol. 4117 (2000) 202–205.
Liow, Y.–T., "A Contour Tracing Algorithm that Preserves Common Boundaries between Regions", Computer Vision Graphics and Image Processing, 53 (3), 313–321, 1991.

* cited by examiner

Primary Examiner—Kanji Bhai Patel
(74) Attorney, Agent, or Firm—Ray G. Wilson (57) ABSTRACT

Contours are extracted for representing a pixelated object in a background pixel field. An object pixel is located that is the start of a new contour for the object and identifying that pixel as the first pixel of the new contour. A first contour point is then located on the mid-point of a transition edge of the first pixel. A tracing direction from the first contour point is determined for tracing the new contour. Contour points on mid-points of pixel transition edges are sequentially located along the tracing direction until the first contour point is again encountered to complete tracing the new contour. The new contour is then added to a list of extracted contours that represent the object. The contour extraction process associates regions and contours by labeling all the contours belonging to the same object with the same label.

6 Claims, 12 Drawing Sheets

Midpoints: 1, 2, 3, 4, 5, 6, 7, 8, 9, 10.
Pixels: A, B, C, D.

Midpoints coordinates and chain codes:
(0.0, −0.5, 8), (−0.5, 0.0, 5), (0.0, 0.5, 7), (0.5, 1.0, 7),
(1.0, 1.5, 7), (2.0, 1.5, 0), (2.5, 1.0, 1), (2.0, 0.5, 3),
(1.5, 0.0, 3), (1.0, −0.5, 3).

Pixel coordinates:
(0.0, 0.0), (1.0, 1.0), (2.0, 1.0), (1.0, 0.0).

Fig. 6
(Trace all contours, DCTraceAll.)

Fig. 7
(Tracing of one contour, DCTrace.)

Fig. 8
(DCTrace, cont.)

Fig. 9
(DCTrace, cont.)

Fig. 10
(FindContourStart)

Fig. 11
(FindContourStart, cont.)

Execution time versus number of contour points.
Experiment was done using a Pentium 850 MHz processor running Windows 2000

METHOD FOR CONTOUR EXTRACTION FOR OBJECT REPRESENTATION

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to contour tracing for use in digital image processing, computer vision, and pattern recognition, and, more particularly, to contour tracing with non-intersecting, non-degenerate contours that enable subsequent object-based processing.

BACKGROUND OF THE INVENTION

A connected region is defined by its outlines or boundaries within which it lies. The boundary set of a region is a significantly "thinner" set that captures the extent and geometry of the region concisely. This property makes boundaries or contours attractive representatives of regions in image analysis to economize the representation of regional information without compromise. It is also easier and more efficient to manipulate regional information through contours by operations such as smoothing, sub-sampling, de-noising, etc.

Object boundary extraction from binary images is important for many applications, e.g., automatic interpretation of images containing segmentation results, printed and handwritten documents and drawings, maps, and AutoCAD drawings. Efficient and reliable contour extraction is also important for pattern recognition due to its impact on shape-based object characterization and recognition. There have been many processes proposed in the references below for contour extraction from binary images. None of these processes guarantee non-intersecting contours or associate the contours with foreground regions they bound.

U.S. Pat. No. 6,173,075, issued Jan. 9, 2001, to Collins, describes a method for converting a pixel map of a drawing into a series of points that define outer and inner perimeters. The process first locates boundary pixels and then finds pixel edge points on the boundary. Rather than locate pixel boundary edge points directly, a complex series of determinations is made as the process traces back through each boundary pixel after all of the boundary pixels are located. It is desirable to locate boundary points directly and sequentially.

Further, the process taught in the '075 patent conveniently acts to associate a new region with a new outer contour that is located. But if the new contour is an inner contour, all of the outer contour regions must be examined to determine which one contains the inner contour.

REFERENCES

Kaygin, S., Bulut, M. M., "A new one-pass process to detect region boundaries," *Pattern Recognition Letters*, 22, 1169–1178, 2001.

Ren, M., Yang, J., Sun, H., "Tracing boundary contours in a binary image," *Image and Vision Computing*, 20, 125–131, 2002.

Bai, Y. B., Xu, X. W., "Object boundary encoding—a new vectorisation process for engineering drawings," *Computers in Industry*, 46, 65–74, 2001.

Jones, N. L., Kennard, M. J., Zundel, A. K., "Fast algorithm for generating sorted contour strings," *Computers and Geosciences*, 26, 831–837, 2000.

Pavlidis, T., *Algorithms for Graphics and Image Processing*, Computer Science Press, 1982, 142–148.

Freeman, H., "Computer processing of line drawing images," *Computational surveys*, 6, 57–97, 1974.

Di Zenro, S., Cinque, L., Levialdi, S., "Run-based processs for binary image analysis and processing," *IEEE Trans. Pattern Analysis and Machine Intelligence*, 18(1), 83–89, 1996.

Bribiesca, E., "A new chain code," *Pattern Recognition*, 32, 235–251, 1999.

Liow, Y.-T., "A contour tracing process that preserves common boundaries between regions," *Computer Vision Graphics and Image Processing*, 53(3), 313–321, 1991.

Prasad, L., Rao, R. L., "A geometric transform for shape feature extraction," *Proc. SPIE*, Vol. 4117, 222–233, 2000.

Various advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The present invention includes a method for contour extraction and contour-region association for representing a pixelated object in a background pixel field. An object pixel is located that is the start of a new contour for the object and identifying that pixel as the first pixel of the new contour. A first contour point is then located on the mid-point of a transition edge of the first pixel. A tracing direction from the first contour point is determined for tracing the new contour. Contour points on mid-points of pixel transition edges are sequentially located along the tracing direction until the first contour point is again encountered to complete tracing the new contour. The new contour is then added to a list of extracted contours that represent the corresponding objects.

In a particular embodiment of the present invention, the method associates the new contour with the corresponding region during the process of contour tracing.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

DETAILED DESCRIPTION

In accordance with the present invention, a new contour extraction and contour-region association process for binary images has two significant features. First, it is a new scheme for contour characterization: instead of tracing centers of consecutive boundary pixels of foreground objects in a binary image, the process traces midpoints of consecutive pixel edges that separate pixels of different "colors" (i.e., regions of different characteristics such as tint, shading, gray-scale, and the like). This method of dilated tracing avoids the self-intersection of contours resulting from revisiting pixels in thin regions of objects. In fact, the process can be applied to the extraction of contours of thin regions of just one pixel width without ambiguities. Contours of thin regions can be processed by the chordal axis transform (see Prasad et al., above) to obtain skeletons that characterize the thin regions as edges.

Second, the process associates regions and contours by labeling all the contours belonging to the same object with the same label. In addition, the process can distinguish between outer contours and inner (hole) contours. For example, if there are two object regions with two and three holes inside correspondingly, then three contours labeled by object "1" are obtained, where one is an outer contour, and two others are inner contours around holes; and the remaining four contours will be labeled by object "2", where one contour is an outer contour and the rest are inner contours. This early contour-region association achieves extraction of objects as individual entities from a segmented image, while at the same time characterizing the objects economically in terms of their boundaries. This eliminates the need for pixel-based morphological operations, such as seed fill, and spatial tessellation techniques, such as a constrained Delaunay triangulation, for object extraction, and enables object-based processing of segmented images.

The process is preferably implemented through software installed on a general purpose digital computer and applied to digitized (i.e., pixelated) binary images, such as previously segmented object and edge images and line drawings.

The process extracts the outer contours around objects and the inner contours around holes enclosed within objects. The process can extract contours based either on an 8-neighborhood or on a 4-neighborhood definition. It does not make any assumption about the number of objects in an image, it will extract as many outer contours as the number of objects presented in an image and as many inner contours as the number of holes within all objects. Extraction of inner contours does not require inverting the binary image. The only assumption that is made by the process is that the "value" of background pixels is set to 0 and the value of object pixels is initially set to 1. However, the process is easily modified to process binary images where background and object regions are coded differently.

Definition: A contour is an 8-contour of a connected set of points if this set is extracted by considering 8-neighborhood connectivity (4 corners and 4 mid-points) between neighboring contour pixels. A contour is a 4-contour if it is extracted adopting 4-neighborhood connectivity (4 mid-points only).

The process assumes that it operates over a copy of the input image data to avoid overwriting the original binary image. This is because the object pixel values of the original binary image are updated from the initial value of 1 to differentiate between pixels visited and unvisited by the tracing process. A buffer is also created that can be implemented either as a 2D array of the same size as the original image or as a dynamic map whose maximum size will be equal to the total number of contour pixels. This buffer is called RegidsData. It is used to create and keep region labels that are used to mark contours.

Figure 1:
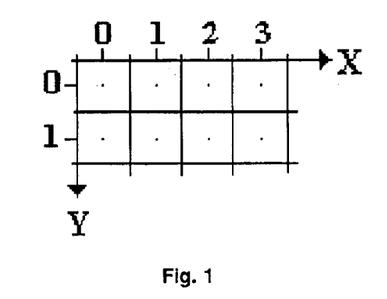
FIG. 1 depicts the image coordinate system convention used herein.
Figure 2:
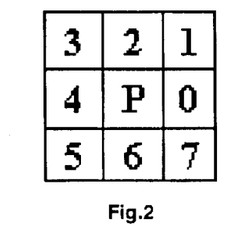
FIG. 2 depicts the chain code convention used for defining neighbors with respect to a pixel P used herein.
Figure 3:
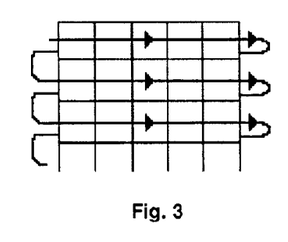
FIG. 3 depicts the scanning image data order convention: from top, 0-th row, to bottom, from left, 0-th column, to right, used herein.

Conventions for an exemplary image coordinate system, chain code and order of scanning are shown in FIGS. 1, 2, 3 respectively. As shown in FIG. 1, pixel locations are identified by integer values of the pixel mid-points (e.g., (1,1), (2,1), (2,2), etc.). FIG. 2 depicts "directions" of neighboring pixels from a pixel P. The exemplary "left-to-right" direction convention for scanning background pixels to locate object pixels is shown in FIG. 3.

Figure 4:
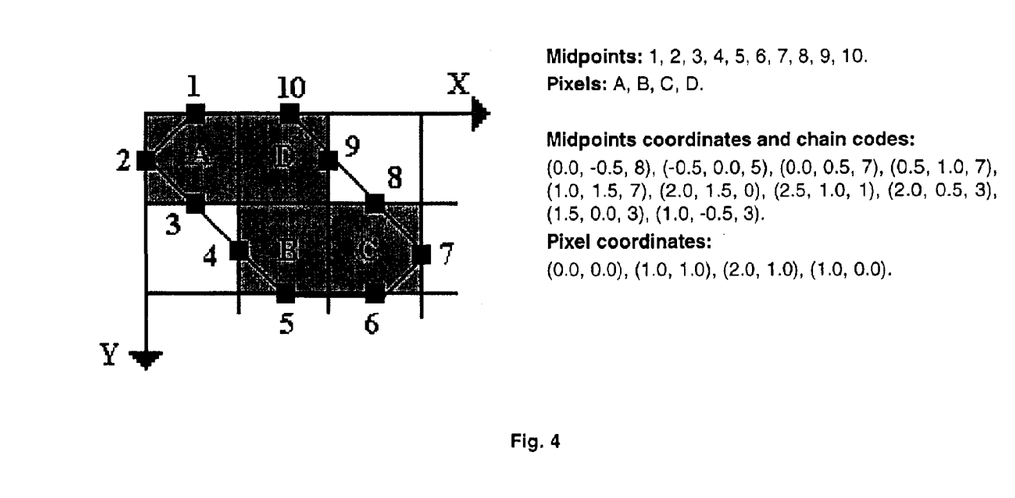
FIG. 4 illustrates a dilated contour using 8 neighbors definition, 8-contour, with the order of recording of contour points and pixels shown in FIG. 4 and their representation using coordinates and chain codes in the dilated contour data structure.
Figure 5:
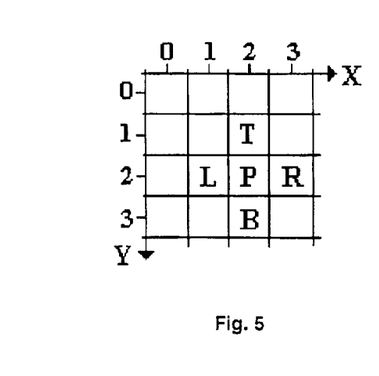
FIG. 5 illustrates the naming convention for neighbors of a pixel, P, where T—top neighbor; R—right neighbor; B—bottom neighbor; L—left neighbor.

FIG. 4 shows examples of a dilated contour and a representation of contour points and pixels used by the new process. FIG. 4 illustrates the application of the conventions shown in FIGS. 1, 2, and 3 to an object consisting of pixels A, B, C, and D. FIG. 5 illustrates the naming convention for the top (T), right (R), bottom (B), and left (L) neighbors of pixel P.

Figure 6:
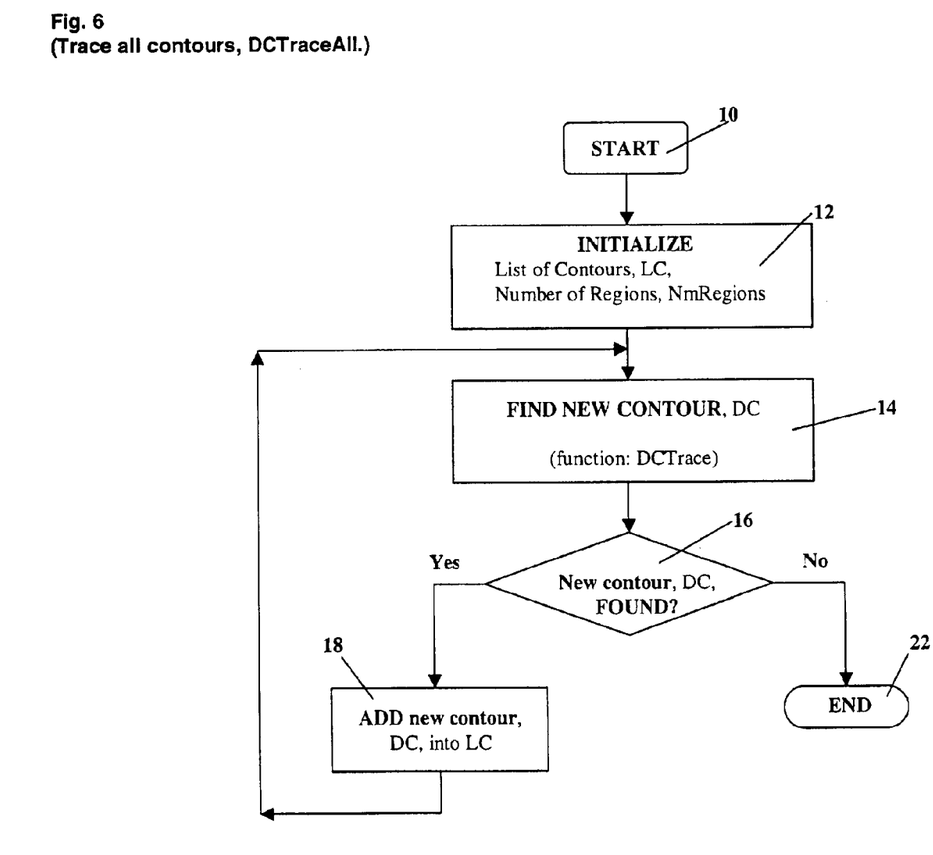
FIG. 6 is a flow diagram for the overall process DCTraceAll.

FIG. 6 is a flowchart giving the over all process DCTraceAll for tracing all of the contours in a binary image. DCTraceAll repeatedly calls DCTrace 14 to find and record 16 a new contour, DC, and add 18 every new contour into the list that contains all the extracted contours, LC.

Traversal of all contours is done using the following process after Start 10 is called:

1. Initialize 12 LC, DC, NmRegions, RegidsData, and startPix.
2. While new contour, DC, is found by DCTrace 14, insert DC into the list of contours, LC 18. Update NmRegions.
3. If a new contour is not found END 22 DCTraceAll.

Figure 7:
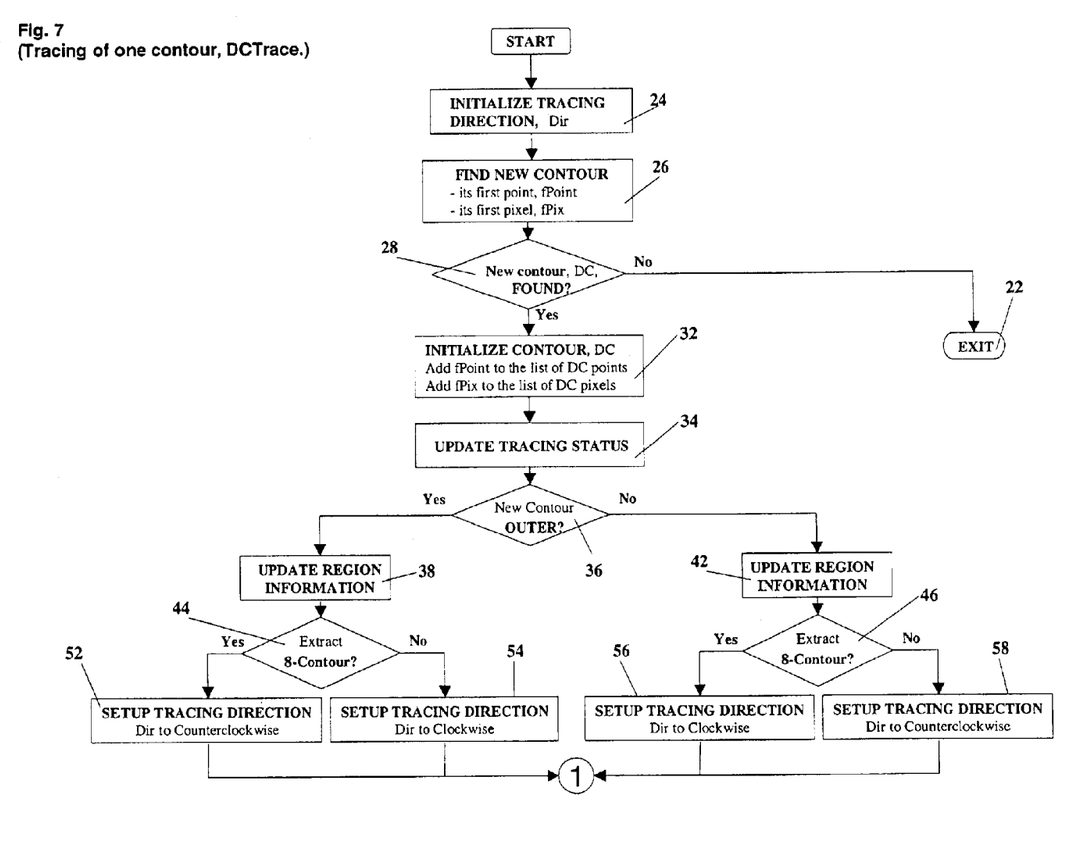
FIGS. 7, 8, and 9 are flow diagrams for the process DCTrace.
Figure 8:
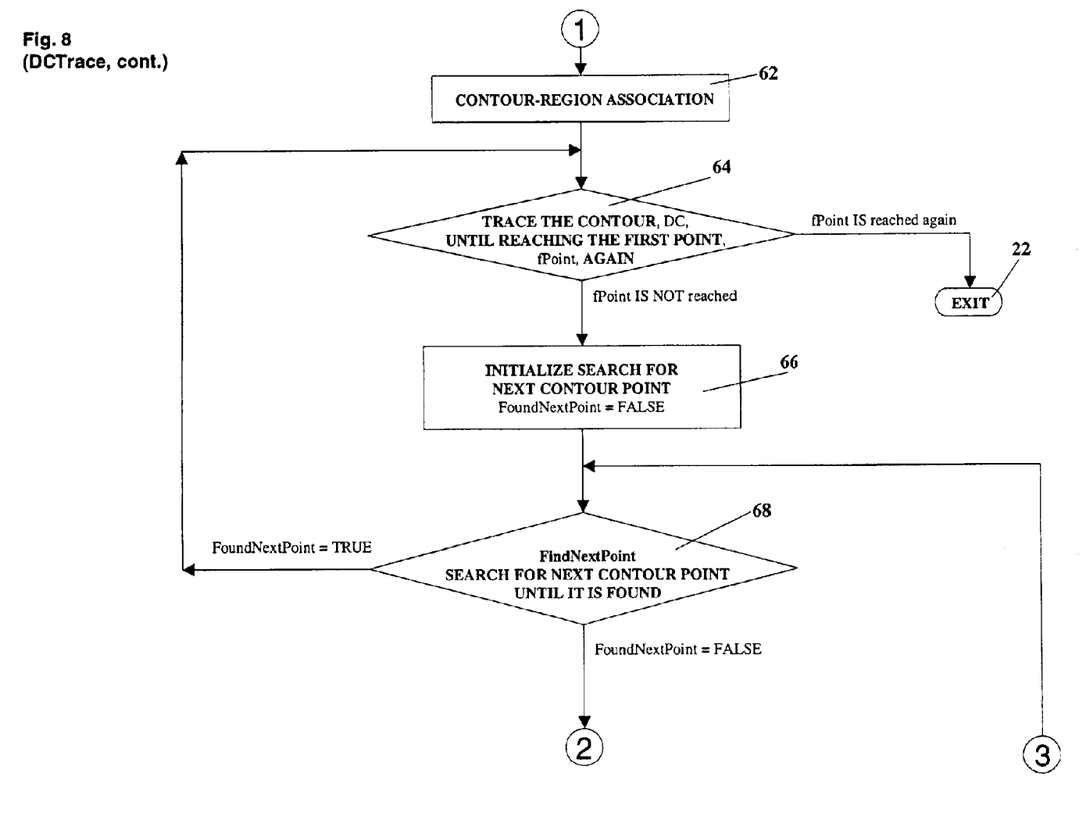
Figure 9:
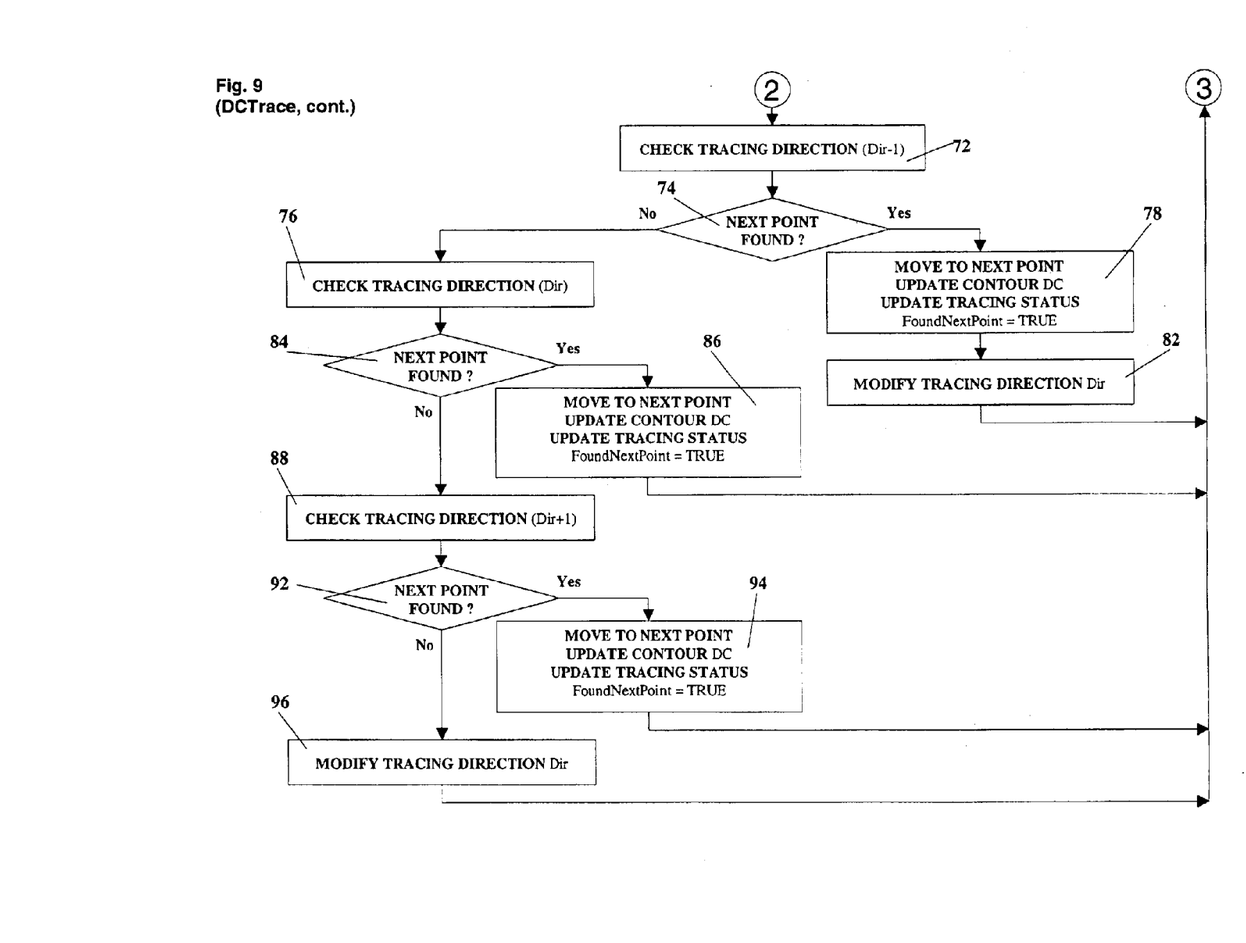
Figure 10:
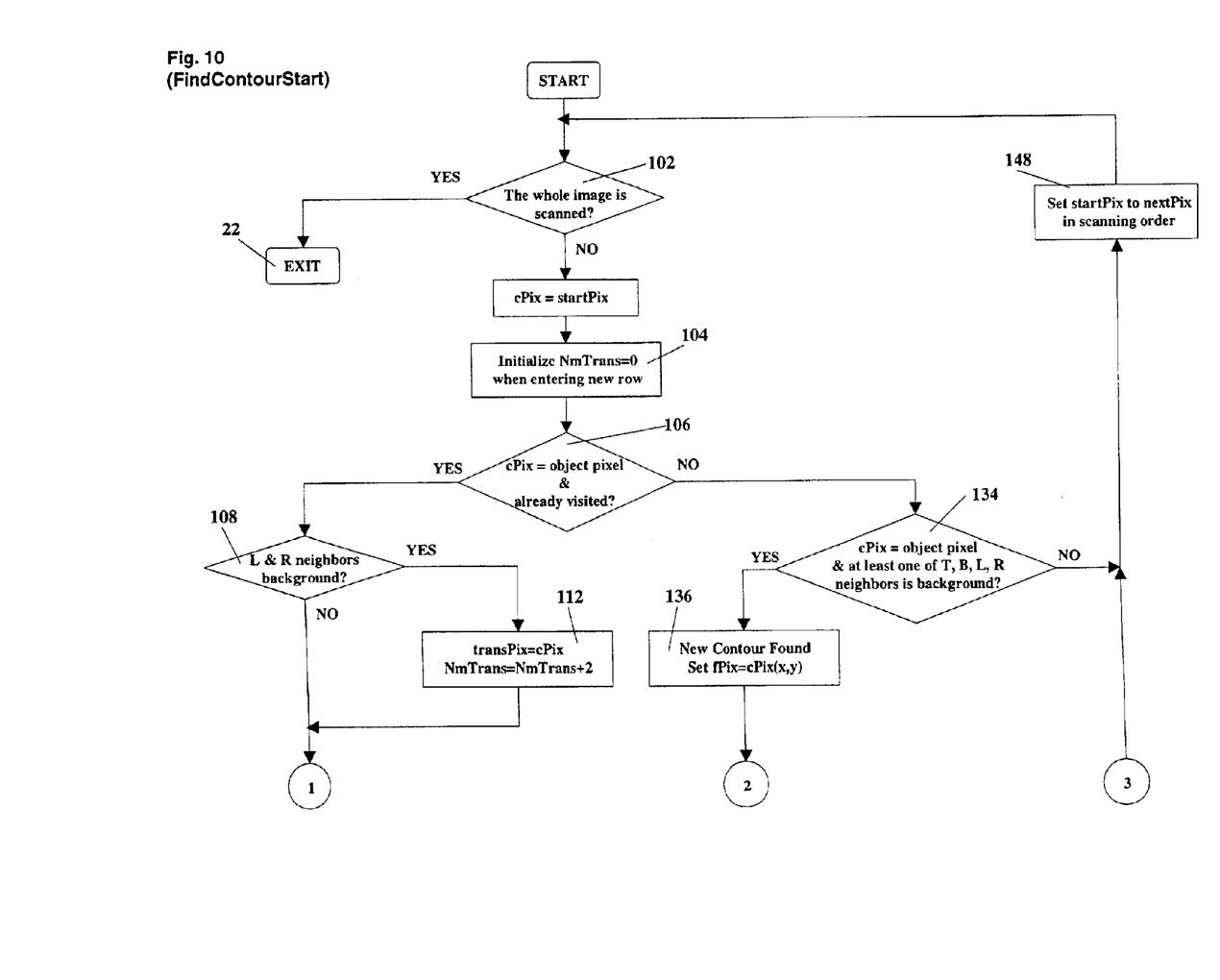
FIGS. 10 and 11 are a flow diagram for the process FindContourStart.
Figure 11:
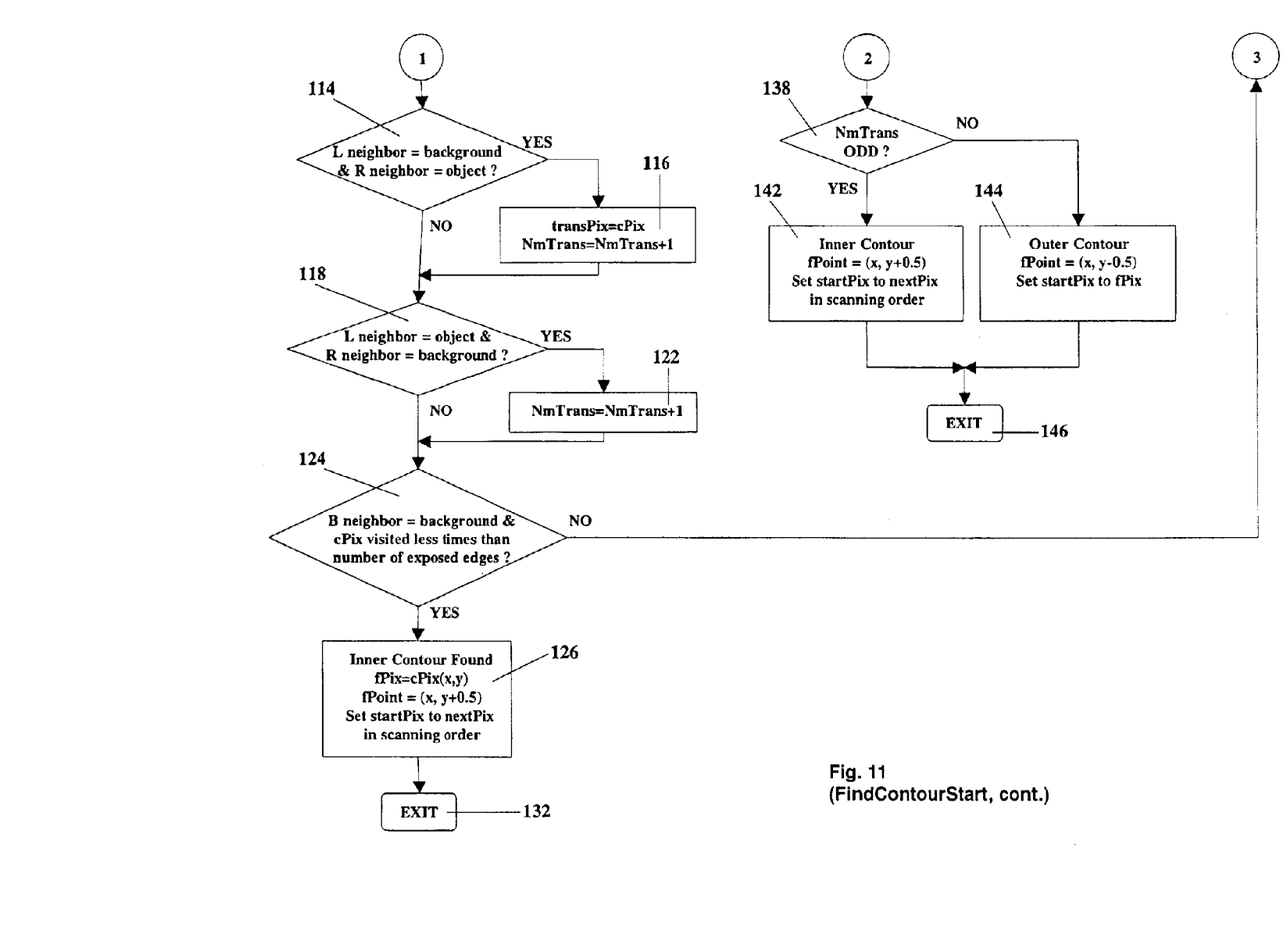

Contour tracing is performed by DCTrace, as shown in FIGS. 7, 8, and 9. A contour is traced starting from its first point found by the procedure FindContourStart 32 (FIGS. 10 and 11). This procedure 14(FIG. 6) initializes 24 a tracing direction, finds 26 the first points of outer contours as well as inner (hole) contours, and provides necessary information for the contour-tracing process.

The contour-tracing process, DCTrace, is applied once 28 for each contour found. Depending on the type of contour whose beginning is found 36 (i.e., Outer/Inner,) and the type of the contour that should be extracted, (i.e., 8-/4-neighbor contour) the process updates region association information 38 or 42, respectively, and makes an appropriate initialization of tracing direction 52, 54, 56, 58. If an Outer and an 8-neighbor contour is extracted 44, then the tracing direction is counterclockwise 52. The tracing direction is set to clockwise 54 for an Outer 4-neighbor contour. For Inner contours 46 (around holes) the situation is reversed: the direction is set to clockwise 56 for 8-neighbors, and it is set to counterclockwise 58 for 4 neighbors.

Referring now to FIG. 8, DCTrace counts the number of object regions using information on whether the new contour is outer or not and stores 62 this number for the higher-level procedure, DCTraceAll (FIG. 6). DCTrace performs contour-region association 62 through the use of background-object transition information, transPix, extracted by the procedure FindContourStart (FIGS. 10 and 11). This association is implemented using the index, RegionID, that is derived from the current number of object regions.

The contour is traced 64 around the object contour pixels to locate pixel contour points. The tracing terminates 22 when the current point, cPoint, is the same as the first point, fPoint. As shown in FIG. 9, the procedure FindNextPoint 68 iteratively checks three directions, (Dir−1) 72, (Dir) 76, and (Dir+1) 88 one after another in the search for the next contour point. Depending on the search result 74, 84, 92, search directions are modified accordingly 76, 88 until the next contour point is found 68. When the next contour point is found 78, 86, 94, this point is added into the list of points belonging to the contour.

The current object pixel, cPix, on whose edge cPoint is found, is added to the contour only if it is not the first pixel, fPix, of the contour, and was not recorded at the previous step, prevPix. The last condition prevents multiple writings of the same pixel. At the same time the region identification buffer, RegidsData, is modified at the position of cPix by assigning the element in the buffer with the current RegionID value that was used at steps 5.2 or 6.1, below, depending on the type of the contour. This enables contour-region association. Since the image is scanned left to right, every time a new contour is found, the region to which the new contour belongs is ascertained by checking the stored region label of the contour element in the same row, where the last background-object transition occurred. These operations are done at steps 8.2.1.2.1–8.2.1.2.2, 8.2.2.2.1–8.2.2.2.2, and 8.2.3.2.1–8.2.3.2.2, below.

The result is a chain code of (dilated) contour points (see, e.g., FIG. 4) describing the newly traced contour, its RegionID indicating which object region it is associated with, and its type (i.e., whether it is Inner or Outer), along with the total number of points in the contour. A corresponding chain code and associated information for the corresponding contour pixels is also obtained in the process. A list data structure can be used to store all this information. The data structure example is shown in FIGS. 14B and 14C.

More particularly, the DCTrace process is as follows (refer to FIGS. 7, 8, and 9):

1. INITIALIZE TRACING DIRECTION, Dir 24.
2. FIND NEW CONTOUR, DC 26, by FindContourStart (FIGS. 10 and 11) that extracts fpoint, fpix, contour type, and coordinates of the pixel transPix that is the site of the most recent background-object transition.
3. IF 28 a new contour is found, THEN go to step 4; ELSE EXIT 22 DCTrace.
4. INITIALIZE CONTOUR 32, DC, by inserting fPoint, Dir, fpix into DC.
   UPDATE TRACING STATUS 34
   Set cPoint to fPoint; Set cPix to fPix.
   Mark traced pixel, cPix, by incrementing its value by 1.
5. IF 36 DC is OUTER contour, THEN do Steps 5.1–5.3, ELSE go to Step 6.
   UPDATE REGION INFORMATION 38
   5.1. Count number of regions by incrementing NmRegions by 1.
   5.2. Set unique region ID, RegionID, based on current NmRegions.
   5.3. IF 44 DC is 8-contour, THEN do 5.3.1, ELSE do 5.3.2.
   SETUP TRACING DIRECTION
   5.3.1 Set tracing direction, Dir, to counterclockwise 52.
      (Using chain code convention shown in FIG. 2, set Dir to 6.) Go to Step 7.
   5.3.2 Set tracing direction, Dir, to clockwise 54.
      (Using chain code convention shown in FIG. 2, set Dir to 0.) Go to Step 7.
6. IF 36 DC is INNER contour, THEN do Steps 6.1–6.2, ELSE go to Step 7.
   UPDATE REGION INFORMATION 42
   6.1. Set RegionID to RegIdsData[transPix].
   6.2. IF 46 DC is 8-neighbor contour, THEN do 6.2.1, ELSE do 6.2.2.
   SETUP TRACING DIRECTION
   6.2.1 Set tracing direction, Dir, to clockwise 56.
      (Using chain code convention shown in FIG. 2, set Dir to 0.) Go to Step 7.
   6.2.2 Set tracing direction, Dir, to counterclockwise 58.
      (Using chain code convention shown in FIG. 2, set Dir to 6.) Go to Step 7.
7. CONTOUR REGION ASSOCIATION 62
   Assign RegionID to DC.
   Set RegIdsData[cPix] to RegionID.
8. TRACE 64 THE CONTOUR, DC, UNTIL REACHING THE FIRST POINT, fPoint, AGAIN
   TRACE the contour, DC, WHILE ((cPoint≠fpoint of DC) OR (cPoint is the only recorded point of DC)), by doing steps 8.1–8.3.
   8.1. INITIALIZE SEARCH FOR NEXT CONTOUR POINT 66
   Set FoundNextPoint to FALSE.
   8.2. SEARCH FOR NEXT CONTOUR POINT UNTIL IT IS FOUND 68
   WHILE FoundNextPoint is FALSE, DO steps 8.2.1–8.2.3 at most three times.
   8.2.1. CHECK TRACING DIRECTION (Dir−1) 72
   CALL FindNextPoint to find nextPoint given cPoint and (Dir−1).
   IF nextPoint that is valid to be in DC, is found, do 8.2.1.1–8.2.1.3, ELSE go to 8.2.2.
   MOVE TO NEXT POINT UPDATE CONTOUR, DC, UPDATE TRACING STATUS 78
   8.2.1.1. Set cPoint to nextPoint; Set cPix to nextPix. Set FoundNextPoint to TRUE.
   8.2.1.2. IF cPoint≠fpoint of DC, THEN do steps 8.2.1.2.1–8.2.1.2.2, ELSE go to 8.2.1.3.
   8.2.1.2.1. Insert cPoint, (Dir−1), into DC.
   Set RegidsData[cPix] to RegID.
   Mark traced pixel, cPix, by incrementing its value by 1.
   8.2.1.2.2. IF cPix≠fpix of the DC AND cPix≠prevpix of DC, THEN insert cPix into DC.

8.2.1.3. MODIFY TRACING DIRECTION 82
  Set Dir to ((Dir+6) modulo 8). Go to 8.2.
8.2.2. CHECK TRACING DIRECTION (Dir) 76
  CALL FindNextPoint to find nextPoint given cPoint and (Dir).
  IF nextPoint that is valid to be in DC, is found, do 8.2.2.1–8.2.2.3, ELSE go to 8.2.3.
    MOVE TO NEXT POINT, UPDATE CONTOUR, DC, UPDATE TRACING STATUS 86
8.2.2.1. Set cPoint to nextPoint; Set cPix to nextPix. Set FoundNextPoint to TRUE.
8.2.2.2. IF cpoint≠fPoint of DC, do steps 8.2.2.2.1–8.2.2.2.2, ELSE go to 8.2.2.3.
8.2.2.2.1. Insert cPoint, (Dir), into DC.
  Set RegidsData[cPix] to RegID.
  Mark traced pixel, cPix, by incrementing its value by 1.
8.2.2.2.2. IF cPix≠fPix of DC AND cPix≠prevpix of DC, THEN insert cPix into DC.
8.2.2.3. Go to 8.2.
8.2.3. CHECK TRACING DIRECTION (Dir+1) 88
  CALL FindNextPoint to find nextPoint given cpoint and (Dir+1).
  IF nextPoint that is valid to be in DC, is found 92, do 8.2.3.1–8.2.3.3, ELSE go to 8.2.4.
    MOVE TO NEXT POINT, UPDATE CONTOUR, DC, UPDATE TRACING STATUS 94
8.2.3.1 Set cPoint to nextPoint; Set cPix to nextPix. Set FoundNextPoint to TRUE.
8.2.3.2 IF cPoint≠fPoint of DC, do steps 8.2.3.2.1–8.2.3.2.2, else go to 8.2.3.3.
8.2.3.2.1. Insert cPoint, (Dir+1), into DC;
  Set RegIdsData[cPix] to RegID.
  Mark traced pixel, cPix, by incrementing its value by 1.
8.2.3.2.2. IF cPix≠fPix of DC AND cPix≠prevPix of DC, THEN insert cPix into DC.
8.2.3.3. Go to 8.2.
8.2.4. MODIFY TRACING DIRECTION 96
  Set Dir to ((Dir+2) modulo 8). Go to 8.2.
8.3. Go to 8.

The process FindContourStart 26 for initiating a new contour is depicted in FIGS. 10 and 11. Given a row to scan, the image data is scanned from the beginning of the given row until the whole image is scanned or a new contour point is found. The exemplary scanning order convention is shown in FIG. 3. The process keeps track of the number of transitions, NmTrans, between background and object regions while scanning a given row. The naming convention for the neighbors of a given pixel is shown in FIG. 5. Object border pixels that are visited during the scanning of image rows are modified in value by incrementing their value by, e.g., 1.

Figure 13:
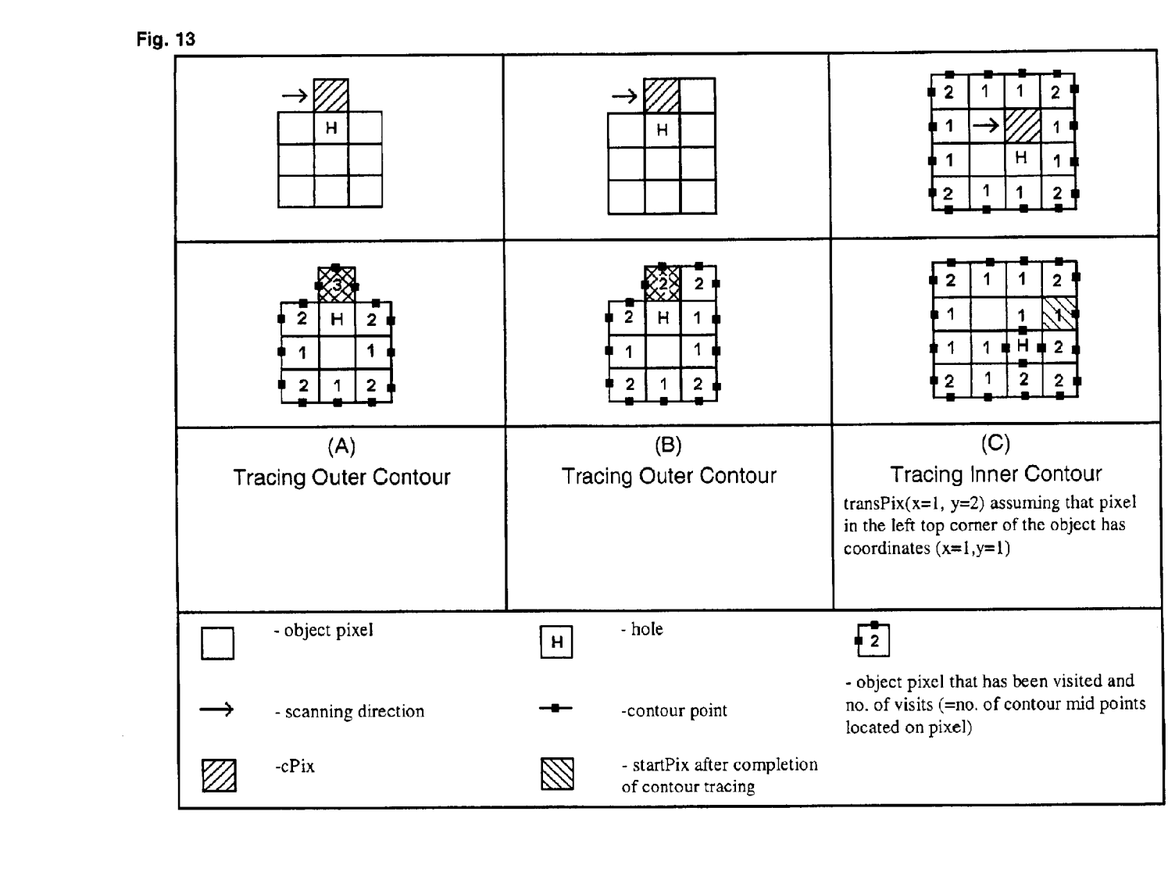
FIG. 13 schematically depicts the contour tracing information generated by the process of FIGS. 7–10.

If a new contour is found, the process produces the coordinates of the first point fPoint (i.e., the midpoint of the first contour pixel edge encountered), the coordinates of the corresponding first pixel, fPix, and coordinates of the pixel, transPix, where the background-object transition occurred last time in a scanned row before the first new contour point is found. As shown in FIG. 13, Column C, transPix information initiates the contour-region association by the dilated contour tracing procedure, DCTrace (FIGS. 7, 8, 9). Depending on whether the number of background-object transitions calculated by FindContourStart is odd or even, a contour is characterized as outer or inner by the DCTrace.

The process FindContourStart is as follows, with reference to FIGS. 10 and 11:

1. Starting 102 from a given pixel element, startPix, while the whole image is not yet scanned or a new contour is not found do steps 2–5, otherwise exit.
2. cPix=startPix, initialize 104 number of background-object transitions, NmTrans, to 0, when entering new row.
3. If 106 current pixel, cPix, is an object pixel and was already visited by scanning procedure, then do steps 3.1–3.4. Else go to step 4.
3.1 If 108 Left and Right neighbors of cPix are background pixels, then 112 increment NmTrans by 2 and store the x and y coordinates of cPix in transPix element defining them as coordinates of the background-object transition.
3.2 If 114 Left neighbor is a background pixel and Right neighbor is an object pixel, then 116 increment NmTrans by 1 and Store coordinates of cpix in transPix element.
3.3 If 118 Left neighbor is an object pixel and Right neighbor is a background pixel, then 122 increment NmTrans by 1.
3.4 If 124 Bottom neighbor is a background pixel and cPix was visited by scanning procedure less number of times than the number of it's exposed edges, then do steps 3.4.1–3.4.2. Else go to step 5.
3.4.1. A new Inner contour is found 126. Store x and y coordinates of the current pixel, cPix, as the first pixel fpix of the new contour pixel, and coordinates of the first new contour point, fpoint, is stored as (x, y+0.5).
3.4.2. Set 126 startpix to next pixel according to the scanning order image convention shown in FIG. 3. Exit 132 FindContourStart.
4. If 134 pixel, cPix, is an object pixel AND at least one out of four neighbors, (Top, Right, Bottom, Left), of cPix is a background pixel, then 136 a new contour is found, store x and y coordinates of the current pixel, cPix, as the first new contour pixel, fPix, and do steps 4.1–4.3. Else go to step 5.
4.1. If 138 NmTrans is odd, then 142 the type of the new contour is Inner, and coordinates of the new contour first point, fPoint, is stored as (x, y+0.5). Set startPix to next pixel according to the scanning order-image convention shown in FIG. 3.
4.2. If 138 NmTrans is even, then 144 the type of the new contour is Outer, and coordinates of the new contour first point, fpoint, is stored as (x, y−0.5). Set startpix to fPix.
4.3. Exit 146 FindContourStart.
5. Go 148 to next pixel according to the scanning order image convention shown in FIG. 3. Go to step 1.

Figure 12:
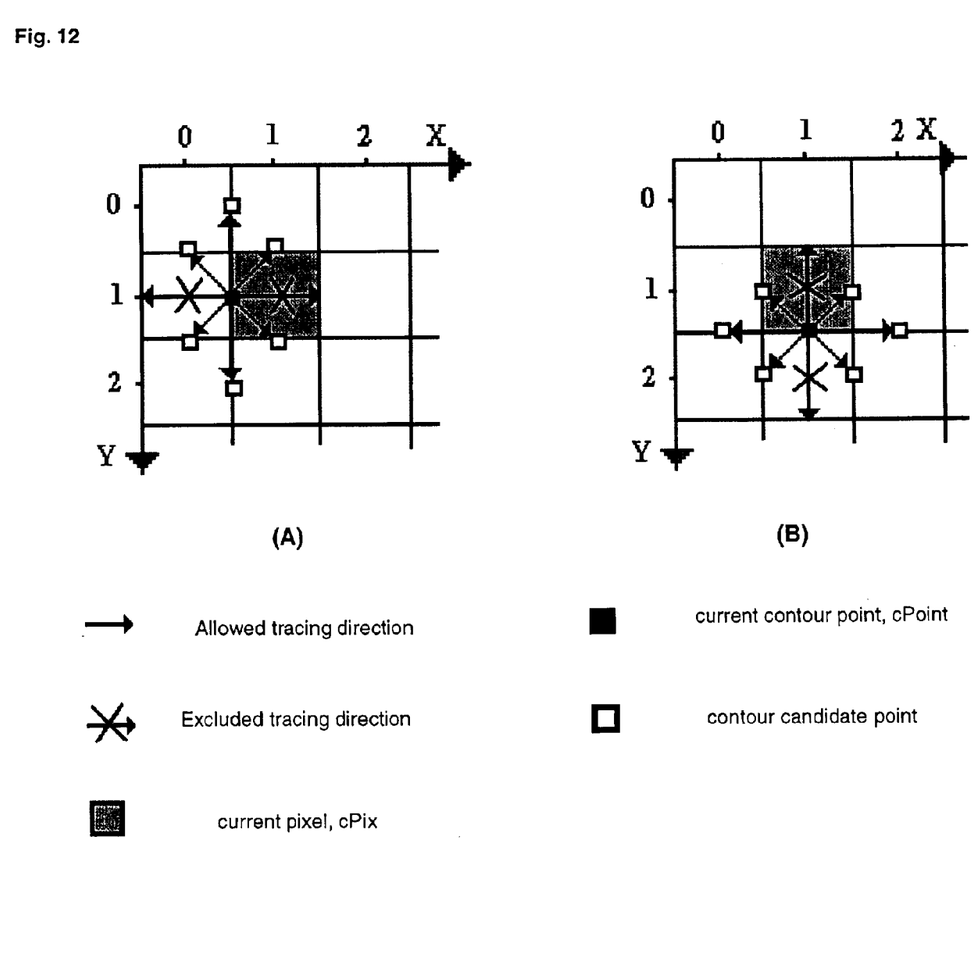
FIGS. 12A and 12B graphically illustrate available tracing directions as a function of the coordinates of a contour point.

The search for the next point to be included in the contour FindNextPoint 68 (FIG. 8) uses numerical properties of x and y coordinates, as shown in FIGS. 12A and 12B. The search is initially provided with the current point, cPoint that is already in the dilated contour and with the tracing direction, Dir, in which to look for the next candidate point. If the x coordinate of the current point, xcur, is not an integer (FIG. 12A), horizontal tracing directions are not considered. If the y coordinate of the current point, ycur, is not an integer (FIG. 12B), vertical tracing directions are not considered. These conditions can also be reformulated using the evenness or oddness of the integer x and y coordinates of the associated pixel of cPoint.

The process is as follows:
1. If xcur of cPoint is not an integer and tracing direction, Dir, is horizontal, go to 5. Else go to step 3.

2. If ycur of cPoint is not an integer and tracing direction, Dir, is vertical, go to 5. Else go to step 3.
3. Calculate coordinates of a candidate point, xcand and ycand, based on the tracing direction, Dir.
4. If the pixel edge containing the candidate point separates a background pixel and an object pixel, go to 4.1; else go to 5.
4.1. The next point of the contour is found. Store the candidate point and the corresponding object pixel by recording their x and y coordinates.
5. Exit.

FIG. 13 pictorially depicts selected aspects of the process described above and shown in FIGS. 7–10 and applied to the object configurations shown in Columns A, B, and C. An image is scanned according to the protocol shown in FIG. 3 beginning 102 at a given image pixel element, startPix, and FindContourStart (FIGS. 10 and 11) is executed. Each pixel becomes the current pixel, cPix, until an object pixel is detected 106. If cPix has already been visited by the scanning procedure, the neighbors (FIG. 5) are determined to be either background or object pixels 108, 114, 118, 124 to determine if cPix is a transition pixel, transPix, or the first pixel, fPix, of an inner contour.

If 134 cPix has not been visited and at least one of the four possible neighbors (FIG. 5) is a background pixel, then a new contour is determined 136 to be found and fPix is set to cPix. If 138 the stored NmTrans is odd (see FIG. 13, Col. C, where there has been one transition), then the new contour is determined 142 to be an Inner contour and the coordinates of the new contour first point are stored as fPoint. If 138 the stored NmTrans is even (see FIG. 13, Col. A and Col. B, where there has been no transition leading to the startPix) then 144 the new contour is Outer and the coordinates of the new contour first point are stored as fPoint.

Once a new inner or outer contour point is found, then DCTrace (FIGS. 7, 8, and 9) is performed to identify and store all of the points on the contour and to update the object pixel values to the number of contour points located for that pixel. The resulting stored contour points and generated corresponding contour pixel values are shown in FIG. 13, Cols. A, B, and C, bottom half. In FIG. 13, Col. A and Col. B, one outer contour has been traced; in FIG. 13, in Col. C, one inner contour has been traced.

FIG. 14A illustrates the resulting outer and inner contour generated by the process of FIGS. 7–10 for the case of 4-contour extraction. A data structure such as a list can be used to store extracted contours (FIGS. 14B and 14C). The data structure contains information on total number of contour points, total number of object regions, holes, contours (both outer and inner) extracted from the image. This information is easily updated when a new contour is added into the list, since all the information about each contour that was already traced by DCTrace procedure is known. In all cases, the invention may be implemented with alternative, known data structures. Also, rather than using horizontal image scanning direction as those shown in FIG. 3, other scanning directions, such as vertical, can be used as well.

Table 1 shows processing time taken to extract contours from binary images on a Pentium 850 MHz processor running Windows 2000 and software written in Visual C++ for different values of total number of contour points, contour pixels, object regions, holes, contours. Further increase in speed can be achieved by optimizing software implementation techniques and making software more hardware specific.

Figure 15:
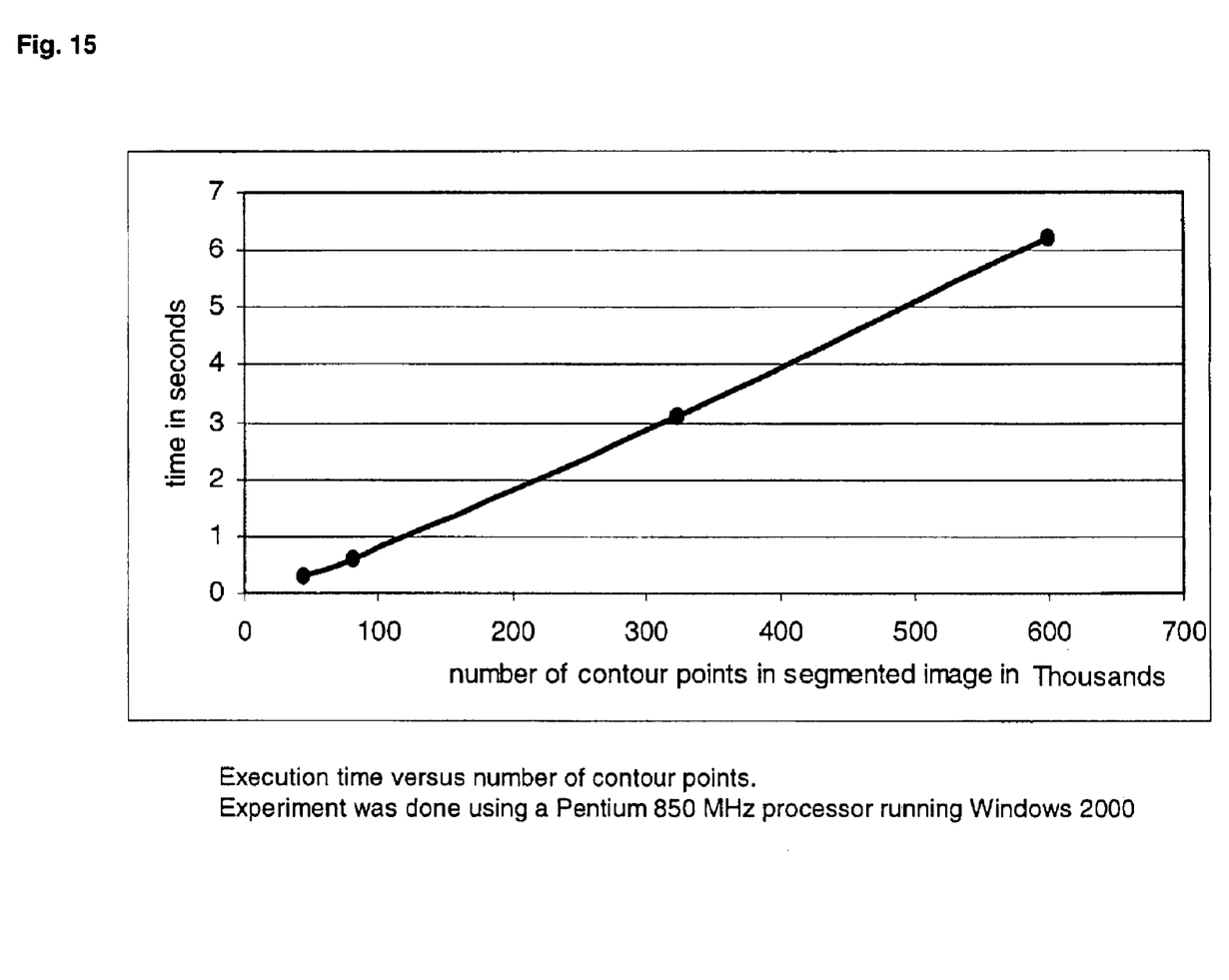
FIG. 15 graphically depicts execution time versus number of contour points in accordance with the process of the present invention.

The size of the image used at line 1 is considered as the reference size. All other size increase factors (lines 2–8 of the table) are given relative to the reference size. The image content for steps 3–4 and 5–6 is the same. The only difference between 3–4 and 7–8 is that the image size is increased by 16 times. In FIG. 15 the number of contour points in the image is plotted (x-axis) versus the time taken (y-axis) by the process in seconds to complete extraction of all contours in the chart below Table 1. The time complexity is dominantly linear in the number of contour pixels. This shows that the execution time of the process of the present invention depends linearly on the number of contour points and not on the number of pixels in the image. This behavior makes the process a viable candidate for contour extraction in real-time applications.

TABLE 1

Time consumed by dialted contour extraction process, DCTraceAll.

| | Relative image size | Number Of | | | | 8-/4- contour type | Time consumed (seconds) |
|---|---|---|---|---|---|---|---|
| | | Contour Points | Regions | Holes | Contours | | |
| 1 | 1 | 44788 | 2 | 5965 | 5967 | 8 | 0.300 |
| 2 | 1 | 44788 | 3 | 4675 | 4678 | 4 | 0.411 |
| 3 | 1 | 80898 | 661 | 5551 | 6212 | 8 | 0.611 |
| 4 | 1 | 80898 | 4052 | 699 | 4751 | 4 | 0.651 |
| 5 | 16 | 323592 | 661 | 5551 | 6212 | 8 | 3.124 |
| 6 | 16 | 323592 | 4052 | 699 | 4751 | 4 | 3.986 |
| 7 | 16 | 600420 | 33189 | 57 | 33246 | 8 | 6.219 |
| 8 | 16 | 600420 | 46747 | 22 | 46769 | 4 | 4.546 |

Figure 14:
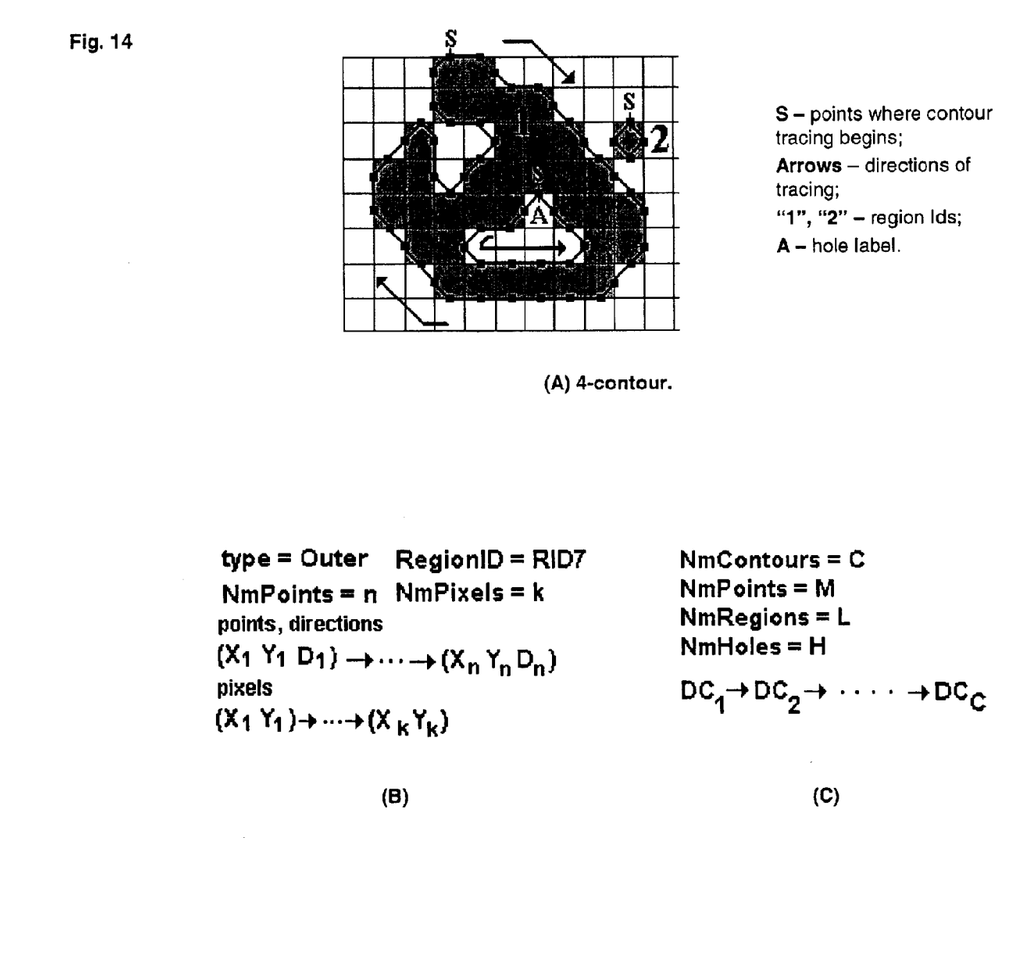
FIG. 14A illustrates the resulting outer and/or inner contour generated by the process of FIGS. 7–10 for the case of 4-contour extraction.
FIG. 14B illustrates a data structure, DC, to store contour information, where storage of points, directions, and pixels is implemented as linked list; global contour information contains contour type, region id, number of points and pixels
FIG. 14C illustrates a data structure to store all contours, where storage of contours is implemented as linked list; global information is information about total number of contours, points, regions, and holes.

The contour extraction process described herein has the following novel features:

1) Traces midpoints of exposed edges of object boundary pixels to avoid degeneracy due to thin regions.
2) Avoids retracing and self intersections of contours.
3) Maintains desired connectivity of object regions as specified by 8-neighbor or 4-neighbor connectivity of adjacent pixels.
4) Reaches and obtains all inner (i.e., hole) contours.
5) Obtains all contours associated with an object region by assigning them a common region label.
6) Avoids degenerate regions in both background and foreground by maintaining a minimum distance of $1/\sqrt{2}$ pixel length between disjoint contours.
7) Distinguishes between inner and outer contour of regions, thus characterizing regions completely in terms of their bounding contours.
8) Can place a point inside a specified region or a hole, enabling higher level region-based processing of objects.
9) Can detect and trace as many contours as a segmented image has, without limitations.
10) Has a time complexity that is dominantly linear in the number of contour pixels (see FIG. 14).

Property 5 of this process enables object-based processing as it is possible to process only those regions and contours that are of interest. Properties 7 and 8 enable the object-specific constrained Delaunay triangulation of contour data, leading to high-level analysis and characterization of object shapes based on regional properties. The process can be applied to images of arbitrary complexity as shown in Table 1. The process's low time complexity makes it an ideal candidate for real-time video image analysis applications in the areas of computer vision and image understanding.

The process has the following novel features: (1) always produces non-intersecting, non-degenerate contours by tracing midpoints of exposed edges of object boundary pixels; (2) does object-based contour extraction by associating contours with regions corresponding to objects, thus enabling subsequent object-based processing; (3) maintains desired connectivity of object regions as specified by 8-neighbor or 4-neighbor connectivity of adjacent pixels; (4) reaches and obtains all inner (i.e., hole) contours; (5) distinguishes between inner and outer contours of regions, thus characterizing regions completely in terms of their bounding contours; (6) places a point inside a specified region or a hole, enabling higher level region-based processing of objects; (7) computational complexity is dominantly linear in the number of contour pixels.

The code's features of automatic generation of contours (contour plots) are expected to have applications in:

Raster-vector image conversion;

The geosciences, Geographic Information Systems (GIS);

CAD applications including
 Automatic conversion of the raster images into a vectorized CAD format (that is called engineering drawings vectorization);
 More accurate characterization and recognition of dimension sets, design primitives.

Interpretation of images of printed and hand-written drawings and documents, including text, engineering drawings, maps, music scores;

Satellite image analysis;

Biomedical and chemical image analysis;

Automotive image systems;

Shape analysis and matching;

Pattern recognition;

Visual information retrieval from databases of images and video sequences;

Image compression by utilizing compressed contour representation.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for contour extraction for representing a pixelated object in a background pixel field comprising:

locating an object pixel that is the start of a new contour for the object and identifying that pixel as the first pixel of the new contour;

locating a first contour point on the mid-point of a transition edge of the first pixel;

determining a tracing direction from the first contour point for tracing the new contour;

locating sequential contour points on mid-points of pixel transition edges along the tracing direction until the first contour point is again encountered to complete tracing the new contour; and adding the new contour to a list of extracted contours that represent the object.

2. The method of claim 1, further including associating a new contour with a corresponding region by labeling it with the corresponding region label.

3. The method of claim 1, further including:

determining whether the new contour is an outer contour or an inner contour when the first contour pixel is located.

4. The method of claim 2, further including:

setting a new region label and assigning it to the new contour when the first contour pixel is located if a new contour is an outer contour;

assigning the region label to the new contour if the new contour is an inner contour, where the region label is determined from where a last background-object transition occurred in a scanned row before the first new contour point is found;

recording tracing directions corresponding to contour points; and recording contour pixels.

5. The method of claim 1, wherein the step of locating sequential contour points includes:

from a located contour point, selecting a tracing direction;

calculating coordinates of a candidate next contour point on a pixel edge along the tracing direction;

determining if the candidate next contour point separates a background pixel from an object pixel;

if so, setting the candidate next contour point as the next contour point;

if not, selecting new tracing directions until a next contour point is located.

6. The method of claim 5, further including:

setting a new region label and assigning it to the new contour when the first contour pixel is located if a new contour is an outer contour;

assigning the region label to the new contour if the new contour is an inner contour, where the region label is determined from where a last background-object transition occurred in a scanned row before the first new contour point is found;

recording tracing directions corresponding to contour points; and recording contour pixels.

* * * * *